United States Patent [19]

Ibrahim

[11] 4,396,657

[45] Aug. 2, 1983

[54] FRAY AND STRETCH RESISTANT COATED ABRASIVE SUBSTRATES IMPREGNATED WITH EPOXY RESINS CURED BY SPECIFIC TYPES OF CATALYSTS

[75] Inventor: Mohamed M. Ibrahim, Ballston Lake, N.Y.

[73] Assignee: Norton Company, Worcester, Mass.

[21] Appl. No.: 334,710

[22] Filed: Dec. 28, 1981

[51] Int. Cl.[3] ............... B32B 1/08; B32B 27/12; B32B 27/26
[52] U.S. Cl. ............... 428/36; 51/400; 51/401; 51/404; 51/407; 428/109; 428/110; 428/148; 428/149; 428/246; 428/272; 428/283; 428/290; 428/294; 428/413
[58] Field of Search ............ 51/400, 401, 404, 407; 428/109, 110, 148, 149, 283, 241, 242, 36, 246, 265, 272, 290, 294, 413

[56] References Cited

U.S. PATENT DOCUMENTS 3,030,743  4/1962  Raymond .
3,631,150  12/1971 Green .

Primary Examiner—James C. Cannon
Attorney, Agent, or Firm—Frank S. Chow

[57] ABSTRACT

Yarn arrays bonded with selected adhesives give coated abrasive products with reduced elongation under stress. Best results are obtained using epoxy resins with dicyandiamide, blocked isocyanates and/or imidazole curing agents as saturants for the yarn arrays.

7 Claims, No Drawings

FRAY AND STRETCH RESISTANT COATED ABRASIVE SUBSTRATES IMPREGNATED WITH EPOXY RESINS CURED BY SPECIFIC TYPES OF CATALYSTS

FIELD OF THE INVENTION

The present invention relates to coated abrasive products having flexible backings which comprise fabrics made with continuous multifilament synthetic textile yarns, or which are reinforced by the presence in the backings of arrays of substantially coplanar and coparallel textile yarns, as described more fully in copending application Ser. No. 6/280,040 which is assigned to the same assignee as this invention. The disclosure of said application is incorporated herein by reference. More particularly, the present invention relates to coated abrasive products with reduced elongation under stress and other improved properties which are achieved by proper selection of the adhesives used to bond together the yarn arrays and/or to prepare fabrics containing such yarns for the deposition of maker adhesive and abrasive grits thereon in the process of manufacture of coated abrasives.

BACKGROUND OF THE INVENTION

In the above-noted copending application, advantageous properties for new and novel coated abrasive products having backings reinforced with arrays of coplanar and coparallel textile yarns were disclosed. As stated in that application, it is possible to make coated abrasives which are satisfactory for many purposes by combining the use of reinforcing yarn arrays with cloth finishing adhesives used for conventional commercial coated abrasives. Examples of such commercially known adhesives include, for example, water-based phenolic resins, starch, animal hide glue, and a variety of water-borne synthetic organic materials such as polymers of esters of acrylic acid, of butadiene and styrene, or of ethylene and vinyl acetate. However, in some very demanding industrial applications such as heavy duty snagging, I have found the need to use special saturation materials in conjunction with the backings described in Ser. No. 6/280,040 in order to improve the performance of the coated abrasive.

One characteristic of the continuous filament polyester yarn reinforced coated abrasives finished with water based phenol- or resorcinol-formaldehyde adhesives is the generation of large volumes of fuzzy detritus from wear along the edges of the belts. The water based phenol- or resorcinol-formaldehyde resin adhesives apparently do not thoroughly penetrate the interior of the multifilament yarns, although they do encase the yarns. As a result, the interior filaments of the yarns are relatively poorly bonded into the structure of the coated abrasive after the surface encasement of resin is broken, as it often is, either by slitting wide abrasive webs to make belts of a desired narrower width or by wear along the edges of belts during use. Poorly bonded interior filaments thus exposed are easily pulled out of the belt, often in fluffy form which occupies a sufficient volume to cause nuisance to the operator using the belt.

Coated abrasive belts having filament polyester reinforcing yarns or woven polyester fabrics that contain substantial amounts of filament yarns and are finished with conventional adhesives containing phenol- or resorcinol-formaldehyde occasionally experienced splitting and/or excessive elongation under the stres of grinding. In addition, laboratory measured tests for tear strength and resistance to elongation (particularly under forces in excess of 25 dekanewtons (daN) per 25 cm of width) coated with conventional adhesives containing phenol- or resorcinol-formaldehyde have indicated a need for improvement in these characteristics for the industrial applications involving aggravated snagging conditions.

It is hypothesized that the reason for all the phenomenon noted above is the relative difficulty of penetration of the multifilament yarns by the adhesives used. Phenol-formaldehyde and resorcinol-formaldehyde adhesives after cure have very high heat distortion resistance, which is a valuable property for coated abrasives, but like all other water-based adhesives, they are relatively poor at wetting the basically hydrophobic surfaces of polyester filaments and thus at penetrating into yarns with many filaments. Better overall bonding, however, appears to be achieved when the yarn consists of many short lengths of fine filaments as in staple rather than very long larger filaments as in multifilament, probably because of the greater surface area of polyester per unit area of fabric surface in the former case. A special object of this invention is to provide finishing adhesives which under practical processing conditions will bond sufficiently to multifilament polyester yarns so as to produce coated abrasive products, coated on backings reinforced with such multifilament yarns, which will be at least as resistant to elongation, splitting, and fuzz generation during use as are conventional coated abrasives with woven staple polyester cloth which is finished with phenol-formaldehyde or resorcinol-formaldehyde resins. Other objects will be apparent from the disclosures below.

SUMMARY OF THE INVENTION

It has been found that saturant materials which are either applied from solution in organic solvents, applied as liquids capable of cure to a solid form without loss of significant mass from the liquid state, or which are dispersed in water but pass through a low viscosity, predominantly organic liquid phase during drying, yield coated abrasives with properties superior to those achieved with water-based phenolic- or resorcinol-formaldehyde resin saturants on substrate fabrics which contain multifilament polyester or other synthetic warp yarns. In a preferred embodiment, epoxy resins with dicyandiamide, blocked isocyanates, and/or imidazole curing agents are used as saturant to impregnate the multifilament yarns to an extent of at least 15% of the mass of the yarns in the cured form.

DESCRIPTION OF THE PREFERRED EMBODIMENTS

Epoxide or epoxy resins are commonly characterized commercially by a term called epoxide equivalent weight, which is defined as the average molecular weight of the resin divided by the average number of epoxide groups per molecule in the resin as described in the text *Epoxide Resins* by W. G. Potter, published by Springer-Verlag, New York, Inc., 1970, pgs. 10-11. I have found that resins derived from the reaction of:

(1) epichlorohydrin and bisphenol A;
(2) epichlorohydrin with a phenolic novolak, under acid conditions, in the presence of a formaldehyde donor;

(3) glycidyl ether epoxide made from the catalyzed condensation reaction of aliphatic polyols (such as glycerol) with epichlorohydrin; or (4) glycidyl ester epoxide made from the catalyzed condensation reaction of carboxylic acid with epichlorohydrin that have epoxide equivalent weight of 150–600 and with 2–8 epoxide groups per molecule are optimal for my invention. Three to four epoxide groups per molecule on average are preferred. These resins are commercially available under a variety of trade names such as Epon (Shell), Epe-Rez (Celanese), Araldite (Ciba Geigy), and Dow Der-X (Dow Chemical).

Three types of curing agents for the epoxide resins have been found to give desirable results. They are:

(a) imidazole or mono or disubstituted imidazoles or mixtures thereof in which the substituents may be alkyl, alkoxy, or aryl such as phenyl, i.e.,

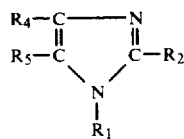

Whereas, $R_1$, $R_2$, $R_4$ and $R_5$ is alkyl, alkoxy, or aryl.

(b) blocked isocyanates (c) dicyandiamide

Examples of substituted imidazoles are: 2-phenyl imidazole; 2-methyl imidazole; 2-ethyl imidazole; or 2-ethyl-4-methyl imidazole.

A blocked isocyanate is defined as one where the prepolymer had the NCO group reacted with a blocking agent such as phenol to prevent the crosslinking reaction at ambient temperatures which is subsequently split off at elevated temperatures to permit the NCO to participate in a crosslinking reaction with the epoxy adhesive.

These include, for example, 4,4'-methylene bis (phenyl carbanilate) using phenol as a blocking agent, Mondur HCB (manufactured by Mobay Company, Pittsburg, PA) an aromatic-aliphatic polyisocyanate copolymer which is ketoxime blocked. In addition to ketoxime and phenol, caprolactam has also been found to be a useful blocking agent.

In practice, one or more of these curing agents, either alone or in combination is employed, in an amount from 1% to 20% of the amount of the epoxide resin used. Cure is preferably effected by heating to at least 120° C., depending on the exact properties of the additives. Requirements for cure can readily be determined by those familiar with usage of epoxide resins.

In order to achieve fuzz resistance in the final coated abrasive product, it is important to use a sufficient amount of the saturant, so that the yarns of the substrate fabric can be thoroughly wet and bonded internally. The amount required differs with the particular fabric used. In general, an amount sufficient to correspond to at least 15% of the weight of the continuous multifilament yarn in the fabric should be used, and 30% is preferable. Larger amounts may be used without serious harm to the properties of the product but are uneconomical.

Because epoxide resins often have a high viscosity, it is advantageous in order to promote easy penetration of the fabric used to apply the epoxide resin from an aqueous dispersion. Dispersion reduces the viscosity to a much lower level, such as 30–50 centipoises, in contrast to the viscosity of 20,000 centipoises or more frequently encountered with undispersed resin of the same type. When dispersed resins are used, only the organic part of the dispersion, which is the only part that will remain in the product after drying and cure, is considered in the determination of epoxide equivalent weights or amounts of curing agent to be used. This convention is to be understood throughout this description, except in specific numbered examples set forth below. In these examples, specific commercially supplied epoxide resins are specified, and weights are given for these resins including the water in which they are dispersed as supplied. Most such dispersed resins are about 60% by weight organic resin.

A convenient commercial source of resins suitable for the purposes of my invention is a series of resins supplied by Celanese Chemical Corp. under the brand name designation "SU-x", where x represents a number from 2–8 which specifies the average number of epoxide groups per molecule. The following table lists water dispersed forms of similar resins that are available under the indicated trademark brand names given below as well as catalysts for these resins.

TABLE I

| Resin | Catalyst |
|---|---|
| CMD-35201 | Dicyandiamide |
|  | 2-Methyl Imidazole |
|  | 2-Phenyl Imidazole |
|  | 2-Ethyl-4-Methyl Imidazole |
| RDX-50049 | Dicyandiamide |
|  | 2-Methyl Imidazole |
|  | 2-Phenyl Imidazole |
|  | 2-Ethyl-4-Methyl Imidazole |
| RDX-58185 | Dicyandiamide |
|  | 2-Methyl Imidazole |
|  | 2-Phenyl Imidazole |
|  | 2-Ethyl-4-Methyl Imidazole |
| RDX-58456 | Dicyandiamide |
|  | 2-Methyl Imidazole |
|  | 2-Phenyl Imidazole |
|  | 2-Ethyl-4-Methyl Imidazole |

When dispersed forms of epoxide resin are utilized for my invention, it is important for the size of the dispersed micelles to be small enough. A micelle of 5 micrometers diameter or less is preferred. If the dispersed micelle particles are too large, wetting and penetration of the yarns are impeded.

The scope of my invention is illustrated by but not limited by the following examples. The following resins were used at various stages in the preparation of the embodiments of the invention to be described. They are grouped and assigned identifying symbols here to save space in later description of the invention.

"PF A" was a resin made with formaldehyde and phenol in a molar ratio of 2.08, catalyzed by sodium hydrozide at pH 8.7, cooked to a final solids content of about 78% in water. "PF B" was a similar resin except that its molar ratio of formaldehyde to phenol was 0.94 and its pH was 8.1.

EXAMPLE 1

Fabric: The fabric for this example was made on a Model 14010 MALIMO Type Malimo stitch bonding machine. Such machines are sold commercially by Unitechna Aushandelgessellschaft mbH of Berlin, Deutsche Demokratische Republik (East Germany). Detailed instructions for use of the machine are provided along with purchase. To make the fabric used here, the warp yarn gauge was set at 14 yarns per 25 millimeters (mm) of fabric width, the stitch length was set at 1.2 mm, hook needle units and fill yarn carrier reed with a gauge of 32 hooks per 25 mm of fabric length were used, and 5 mm high hook needles, medium size sliding needles and closing wires, tricot style stitching, and round rather than oval retaining pins among other choices offered for this machine were used. Gears available from, but not known to be recommended by, the manufacturer were used to cause the fill yarn carrier to advance at one quarter the speed normally recommended by the manufacturer for the combination of hook needle spacing and number of fill yarns supplied, so that an average of four fill yarns would be retained by each hook needle. Further details of the method of making fabrics of this type may be found in copending application Ser. No. 6/297,538, which is assigned to the same assignee as this invention.

The fabric made as noted above had 14 warp yarns of 1300 denier polyester multifilament yarn (Type 68 Dacron from duPont) per 25 mm of width, 128 fill yarns of 170 denier polyester multifilament (Type 731 Texturized Fortrel from Celanese) per 25 mm of length, and stitching yarns of 70 denier high tenacity polyester (Type 68 Dacron from duPont). Areal density of the assembled fabric was approximately 200 g. per meter squared.

Saturation: The saturating adhesive had the following composition:

| | |
|---|---|
| CMD 35201 (a water-dispersed epoxy resin, product of Celanese Chemical Co.) | 900 parts |
| Water | 500 parts |
| Dicyandiamide solution (10% by weight in water) | 180 parts |
| 2-Methylimidazole | 3 parts |
| Falcoban NS Defoamer (product of Fallek Chemical Co., New York NY) | 2 parts |

The above ingredients were added in the order listed, with stirring after each addition.

The fabric noted above was dipped into the adhesive composition, then passed between two vertically opposed calender rolls pressed together so as to leave an amount corresponding to 57–63 dry grams per square meter (gm/m$^2$) of adhesive on the fabric. The wet saturated fabric was then held in a tenter frame and passed for 1.0 minute through an oven held at 215 degrees Celsius (C.) to dry and partially cure the adhesive and heat-set the fabric. During this heating process, the tenter clips were maintained at a width which was (111/114) times the original width of the fabric off the Malimo machine. The fill yarn side of the fabric was down during passage through the calender rolls and oven.

Frontfilling: The composition of the frontfilling adhesive used was:

| | | |
|---|---|---|
| 1. | Resin "PF A" | 393 parts |
| 2. | Resin "PF B" | 282 parts |
| 3. | Sulframin 1260 Solution (33% water by weight; Sulframin is a form of sodium linear alkyl aryl sulfonate sold by Witco Chemicals, New York, NY) | 40 parts |
| 4. | Calcium carbonate (sized as described in U.S. Pat. No. 2,322,156) | 850 parts |
| 5. | Hycar 26138 (an acrylate polymer emulsion sold by B. F. Goodrich, Inc.) | 102 parts |
| 6. | Sodium hydroxide solution (5% by weight in water) | as needed |
| 7. | Water | as needed |

The frontfilling adhesive was mixed as follows: Ingredients 1, 2, and 3 were stirred together. With the aid of a Myers Model 775 mixer (sold by Myers Engineering, 8376 Salt Lake Road, Bell, Calif.), ingredient 4 was then added to this mixture slowly, with care not to exceed the amperage limit of the mixer until all of this ingredient was added: In a separate container, ingredient 6 was added to ingredient 5 slowly with constant stirring until the pH was raised to 9. This mixture was then added slowly with stirring to the previously mixed ingredients 1, 2, 3, and 4. Finally, ingredient 7 was added to the mixture of all the previous ingredients, with constant stirring, until the viscosity of the mixture was brought into the range 19,000–20,000 centipoises (cps) as measured by a Brookfield Viscometer Model LVF-5X, using spindle #4 at 12 revolutions per minute (RPM), at a temperature of 25° C. (Note: Brookfield viscometers are sold by Brookfield Engineering Labs, 240 Cushing Street, Stoughton, MA).

The adhesive prepared as noted immediately above was applied to the fill yarn side of the saturated fabric by a knife-over-roll technique in an amount sufficient to give an add-on of 130–145 gm/m$^2$ after drying. The adhesive was dried, while holding the cloth in a tenter set to the same width as the cloth had after saturating, by passing it successively through oven zones as follows: 1.0 minute at 107° C., 0.5 minute at 121° C., and 0.5 minute at 160° C.

Backfilling: The composition and mixing of the adhesive were the same as described above for Frontfilling, except that dye which has no material effect on the properties was added to the backfilling adhesive. This adhesive was applied on the warp yarn side of the saturated and frontfilled fabric by a two calender coater, then smoothed with a spring blade. The amount applied was sufficient to give 290–310 gm/m$^2$ after drying. Drying was accomplished by supporting the coated web on slats in a festoon oven and passing the supported web through oven zones set to give the following exposure: 33 minutes at 71° C. and 59 minutes at 88° C.

Making and Sizing: The backing as prepared above is suited to conventional coated abrasive making and sizing processes, using phenol-formaldehyde resin adhesives and conventional electrostatic coating of grain. Many variations of adhesive composition and processing are possible and are well-known to those skilled in the art, so that they will not be given here in detail. The backing prepared as described above was made into a product coated on the fill yarn side with grit 36 NZ Alundum grain (sold by Norton Company, Worcester, Mass.) using an adhesive composed of essentially 7 parts of resin "PF A", 3 parts of resin "PF B", and 12 parts calcium carbonate sized as described in U.S. Pat. No. 2,322,156, for the purposes of the testing described below.

EXAMPLE 2

This example illustrates practice before the present invention.

Fabric: The fabric used was the same as for Example 1.

Saturation: The saturating adhesive in this example was a combination of resorcinol, formaldehyde, and Tycar 26138, with sodium hydroxide as a catalyst for the condensation of resorcinol and formaldehyde. Greater detail is available in Example 2 of copending Ser. No. 6/297,538.

Frontfilling: The frontfilling adhesive and processing were the same as for Example 1, except that the amount of frontfill adhesive for this example was 225-240 m/m².

Other Processing: Backfilling, making, and sizing materials and processes for this example were the same as for Example 1.

EXAMPLE 3

For this example, all operations and materials were the same as for Example 1 with the exception of the epoxide resin, which was RDX 58456 instead of CMD 5201. The product of this example was tested in a grinding laboratory and found to have shed resistance superior to that of the product from Example 1. However, the RDX 58456 is more expensive than CMD 5201 which is preferred on a cost basis.

EXAMPLE 4

For this example, all operations materials and conditions were the same as for Example 1, except for the curing agent used in the saturant. The specific composition of the saturating adhesive was:

| | |
|---|---|
| CMD 35201 | 900 parts |
| Water | 500 parts |
| 4,4'-Methylene-bis-(phenylcarbanilate) | 68 parts |
| Falcoban NS Defoamer | 2 parts |

These ingredients were added in the order listed, with stirring after each addition. (Note: 4,4'-methylene-bis (phenylcarbanilate), which is a phenol-blocked diisocyanate, was obtained under the brand name Bonding Agent P-1 from Naugatuck Chemicals, Naugatuck, CT 06770).

The final coated abrasive prepared according to this example was tested in a grinding laboratory and found equal or slightly superior to that prepared according to Example 1 in shed resistance and elongation resistance.

Comparative Testing

Elongation Resistance: Products prepared according to Examples 1 and 2 described above were tested for elongation resistance substantially in accordance with the method of ASTM D1682-64, except that the sample length was 25.4 cm rather than 7.6 cm and a fixed elongation speed of 12.7 cm/minute was used irrespective of time to break. Results are shown in the Table below; they indicate that the product of Example 1 has much greater resistance to elongation, particularly at the lower values of tensile force shown, which are believed to approximate some of those most common on commercial coated abrasive belt using machinery.

TABLE II

| Comparative Elongation Resistance | | | |
|---|---|---|---|
| | Percentage Elongation at Tensile Force Shown (in daN/25 mm): | | |
| Product and Direction | 45 | 67 | 89 |
| Example 1, warp direction | 1.2 | 4.3 | 7.6 |
| Example 2, warp direction | 2.6 | 5.8 | 8.5 |
| Example 1, fill direction | 0.7 | 11 | |

TABLE II-continued

| Comparative Elongation Resistance | | | |
|---|---|---|---|
| | Percentage Elongation at Tensile Force Shown (in daN/25 mm): | | |
| Product and Direction | 45 | 67 | 89 |
| Example 2, fill direction | 1.3 | 14 | |

Grinding Tests: Belts made from products prepared according Examples 1 and 2 were compared to each other and to a commercial product with similar abrasive grits coating but on backing with a woven cloth substrate (Type R824 from Norton Company, Worcester, Mass.) in the practical dimensioning of diecast parts made from Type 380 aluminum. The grinding machine used was a Two Head Grino (sold by Timesavers, Inc., Minneapolis, Minn.) with a 112 kilowatt motor driving the belt at speed of 2225 meters per minute. A downfeed rate of 0.20 mm/second was used to obtain a total stock removal of 1.5 mm. Belt tension was 22-27 daN/25 mm. Grinding with R824 produced an average of 700 similar shape and size parts per belt. With equally sized belts of product from Example 1, an average of 880 parts per belt was achieved. With product from Example 2, highly variable results, from 70-425 parts were obtained primarily because the belts frequently split longitudinally.

I claim:

1. In a coated abrasive product having a backing comprising continuous synthetic multifilament yarns, the improvement wherein said continuous synthetic multifilament yarns are impregnated to an extent of at least 15% of the mass of the yarns with a material which is the cured product of a liquid saturant comprising:
   (a) an epoxide resin with an epoxide equivalent weight between 150 and 600; and
   (b) a curing agent selected from the group consisting of
      (i) an amount of dicyandiamide within the range of 15-100 grams for each epoxide gram equivalent weight present in the epoxide resin specified in part (a),
      (ii) an amount of imidazole or alkyl or aryl substituted imidazole corresponding to from 1 to 5 percent by weight of the amount of epoxide resin specified in part (a), and
      (iii) an amount of an organic compound comprising at least two reversibly blocked isocyanate groups per molecule corresponding to from 5 to 20 percent by weight of the amount of epoxide resin specified in part (a).

2. In a coated abrasive product as in claim 1 wherein the epoxide resin has an epoxide equivalent weight of 200.

3. In a coated abrasive product as in claim 1, wherein the epoxide resin is an aqueous dispersion of an epichlorohydrin and bisphenol A condensate with an average of 3 epoxide groups per molecule and an epoxide equivalent weight of approximately 200.

4. In a coated abrasive product as in claim 1, wherein the curing agent is 2-Phenyl Imidazole.

5. In a coated abrasive product as in claim 4, wherein the amount of curing agent is in the range of 1 to 10% by weight of the epoxide resin solids present in the adhesive composition.

6. In a coated abrasive product as in claim 1, wherein the epoxide resin is an aqueous dispersion of epichlorohydrin and bisphenol A with an average of 2 epoxide groups per molecule, an epoxide equivalent weight of 500-600, and the curing agent is a combination of dicyandiamide and 2-methyl imidazole in a weight percentage ratio of 3.3:0.55 based on the epoxide resin.

7. A coated abrasive according to any one of claims 1-6 in the shape of an endless belt.

* * * * *